(12) United States Patent
Mori

(10) Patent No.: US 12,535,650 B2
(45) Date of Patent: Jan. 27, 2026

(54) OPTICAL SYSTEM AND IMAGE PICKUP APPARATUS HAVING THE SAME

(71) Applicant: CANON KABUSHIKI KAISHA, Tokyo (JP)

(72) Inventor: Takeo Mori, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 295 days.

(21) Appl. No.: 18/507,149

(22) Filed: Nov. 13, 2023

(65) Prior Publication Data

US 2024/0192464 A1    Jun. 13, 2024

(30) Foreign Application Priority Data

Dec. 7, 2022   (JP) .................................. 2022-195846

(51) Int. Cl.
   *G02B 9/10*   (2006.01)

(52) U.S. Cl.
   CPC ..................................... *G02B 9/10* (2013.01)

(58) Field of Classification Search
   CPC ........................................................ G02B 9/10
   USPC ........................................................ 359/708
   See application file for complete search history.

(56) References Cited

U.S. PATENT DOCUMENTS

| | | | |
|---|---|---|---|
| 9,829,681 B2 | 11/2017 | Mori | |
| 10,670,832 B2 | 6/2020 | Mori | |
| 10,887,510 B2 | 1/2021 | Mori | |
| 11,640,048 B2 | 5/2023 | Mori | |
| 11,703,661 B2 | 7/2023 | Mori | |
| 2005/0243438 A1* | 11/2005 | Hamano | G02B 15/144113 359/692 |
| 2012/0127594 A1* | 5/2012 | Yamamoto | G02B 13/04 29/469 |
| 2013/0271851 A1* | 10/2013 | Souma | G02B 3/04 359/708 |
| 2018/0348478 A1* | 12/2018 | Mori | G02B 13/02 |
| 2019/0149727 A1* | 5/2019 | Mori | H04N 23/55 348/222.1 |
| 2021/0231931 A1* | 7/2021 | Mori | G02B 15/144113 |
| 2022/0334363 A1 | 10/2022 | Mori | |
| 2023/0308735 A1 | 9/2023 | Mori | |

FOREIGN PATENT DOCUMENTS

JP   2020-115174 A   7/2020

* cited by examiner

*Primary Examiner* — Sharrief I Broome
(74) *Attorney, Agent, or Firm* — Carter, DeLuca & Farrell LLP

(57) ABSTRACT

An optical system includes, in order from an object side to an image side, a front group, an aperture stop, and a rear group that has positive refractive power as a whole. The front group includes a first lens having negative refractive power disposed closest to an object. The rear group includes a final lens having positive refractive power disposed closest to an image plane. The optical system includes four or more lenses disposed between the first lens and the final lens. A lens surface near an optical axis of the final lens has a meniscus shape with a convex surface on the object side. Predetermined inequalities are satisfied.

17 Claims, 5 Drawing Sheets

OPTICAL SYSTEM AND IMAGE PICKUP APPARATUS HAVING THE SAME

BACKGROUND

Technical Field

One of the aspects of the embodiments relates generally to an optical system, and more particularly to an optical system suitable for digital video cameras, digital still cameras, broadcasting cameras, film-based cameras, surveillance cameras, and the like.

Description of Related Art

As image sensors become smaller and have more pixels, optical systems for image pickup apparatuses are demanded to be smaller and have higher optical performance. In order to satisfy this demand, Japanese Patent Application Publication No. 2020-115174 discloses an optical system that consists of, in order from the object side to the image side, a first lens having positive refractive power, a second lens having negative refractive power, a third lens, a fourth lens, a fifth lens, and a sixth lens. The lens surface on the object side of the first lens is convex near the optical axis. The lens surface on the image side of the second lens is concave near the optical axis. The lens surface on the object side of the third lens is convex near the optical axis. The lens surface on the image side of the fourth lens is a convex surface near the optical axis. The lens surface on the object side of the fifth lens is convex near the optical axis. The lens surface on the image side of the sixth lens is concave near the optical axis.

In order to reduce the overall length of the optical system, it is effective to adopt a telephoto type power arrangement and strengthen the positive refractive power on the object side and the negative refractive power on the image side. However, in a case where the telephoto type power arrangement is strengthened, a large amount of pincushion type distortion will occur, and thus it becomes difficult to satisfactorily correct both distortion and curvature of field with a limited number of lenses. In a case where the telephoto type power arrangement is strengthened, the back focus becomes shorter and the exit angle of the off-axis light beam becomes larger.

The optical system described in Japanese Patent Application Publication No. 2020-115174 uses a telephoto power arrangement to reduce the overall length, and uses a plurality of aspheric lenses to correct distortion and curvature of field, but the Petzval sum of the entire system is large, and the exit angle of the off-axis light beam is also large. Thus, in an attempt to apply the optical system of Japanese Patent Application Publication No. 2020-115174 to an image pickup apparatus with a large image sensor, it becomes difficult to satisfactorily correct curvature of field and reduce a peripheral light amount.

SUMMARY

An optical system according to one aspect of the embodiment includes, in order from an object side to an image side, a front group, an aperture stop, and a rear group that has positive refractive power as a whole. The front group includes a first lens having negative refractive power disposed closest to an object. The rear group includes a final lens having positive refractive power disposed closest to an image plane. The optical system includes four or more lenses disposed between the first lens and the final lens. A lens surface near an optical axis of the final lens has a meniscus shape with a convex surface on the object side. The following inequalities are satisfied:

$$0.1 < TTL/(f \times \tan \omega) < 4.0$$

$$1.50 < PNdave < 2.00$$

$$0.2 < sk/TTL < 1.0$$

where f is a focal length of the optical system, ω (°) is a half angle of view of the optical system, sk is a back focus of the optical system, TTL is a length acquired by adding the back focus to a distance on an optical axis from a lens surface closest to the object of the optical system to a lens surface closest to an image plane of the optical system, and PNdave is an average value of refractive indices for d-line of materials of all positive lenses included in the optical system. An image pickup apparatus having the above optical system also constitutes another aspect of the embodiment.

Further features of the disclosure will become apparent from the following description of embodiments with reference to the attached drawings.

DESCRIPTION OF THE EMBODIMENTS

Figure 1:
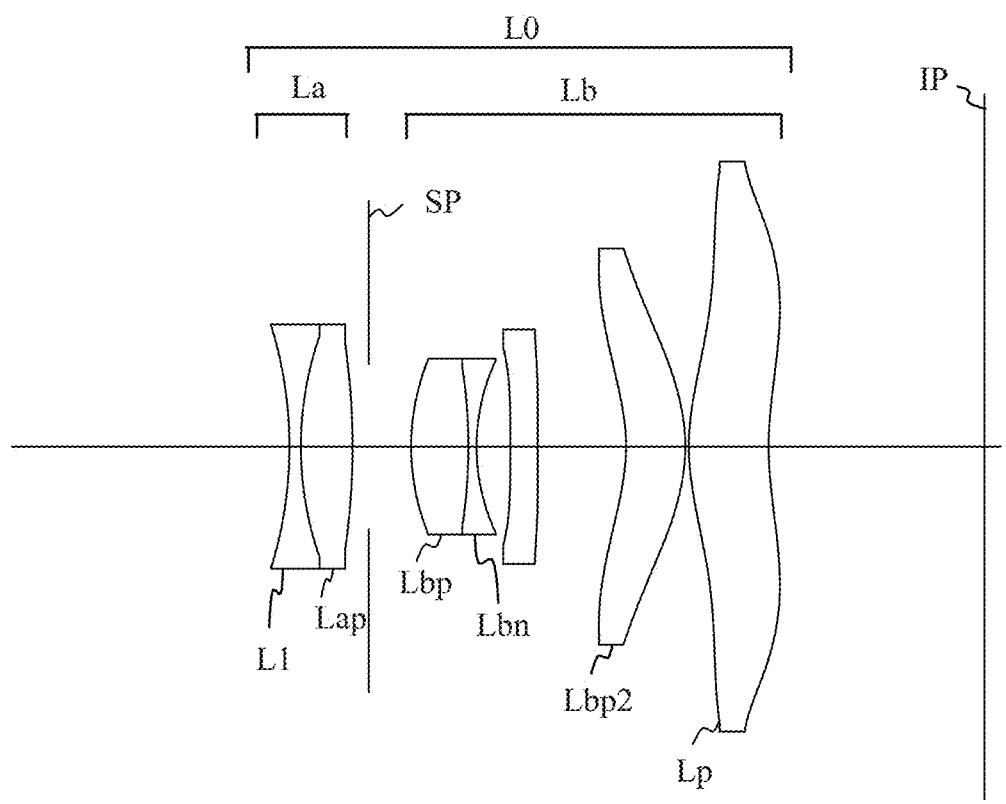
FIG. 1 is a sectional view of an optical system according to Example 1.
Figure 2:
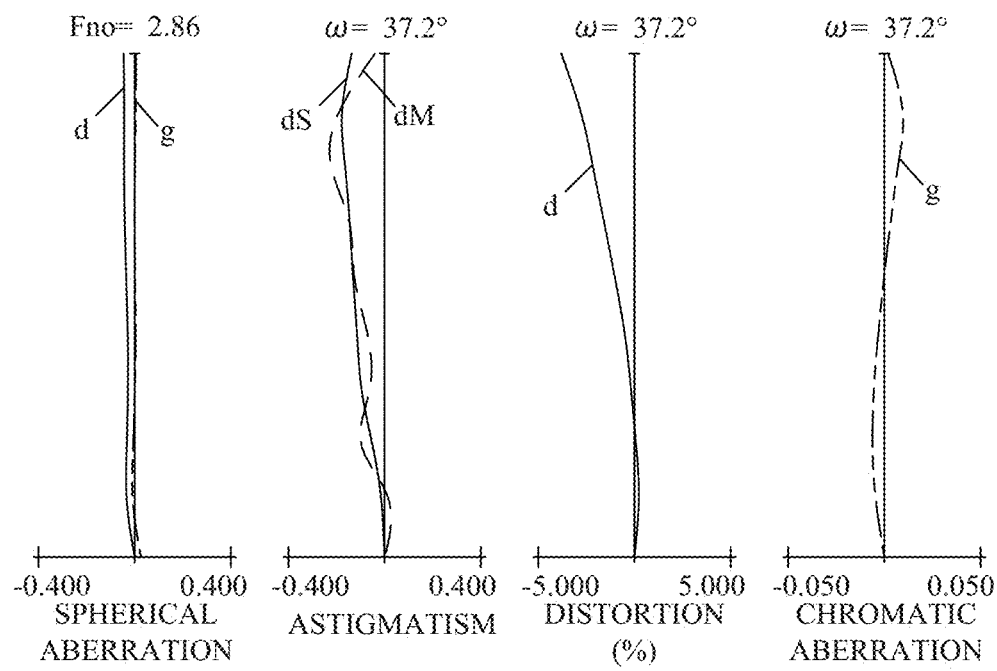
FIG. 2 is an aberration diagram of the optical system according to Example 1 in an in-focus state at infinity.
Figure 3:
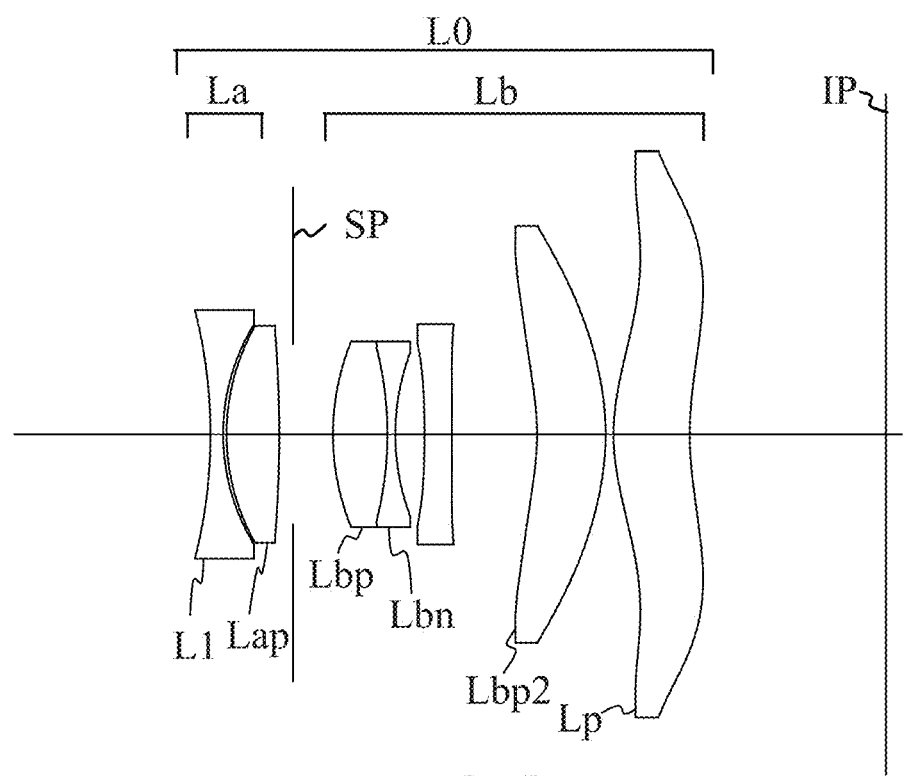
FIG. 3 is a sectional view of an optical system according to Example 2.
Figure 4:
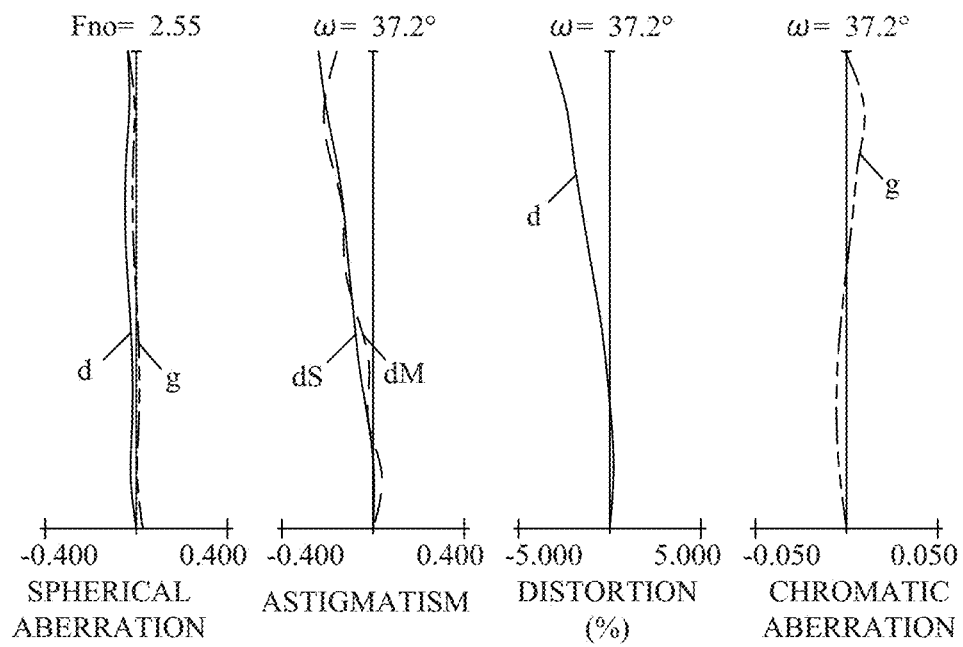
FIG. 4 is an aberration diagram of the optical system according to Example 2 in an in-focus state at infinity.
Figure 5:
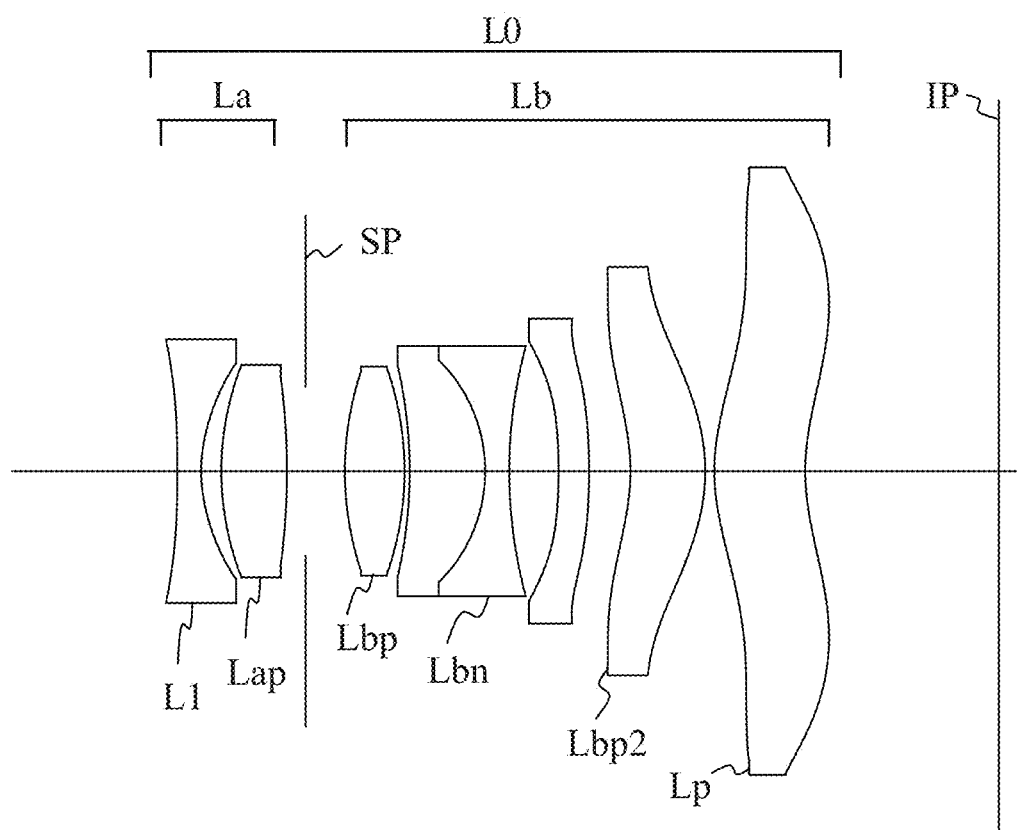
FIG. 5 is a sectional view of an optical system according to Example 3.
Figure 6:
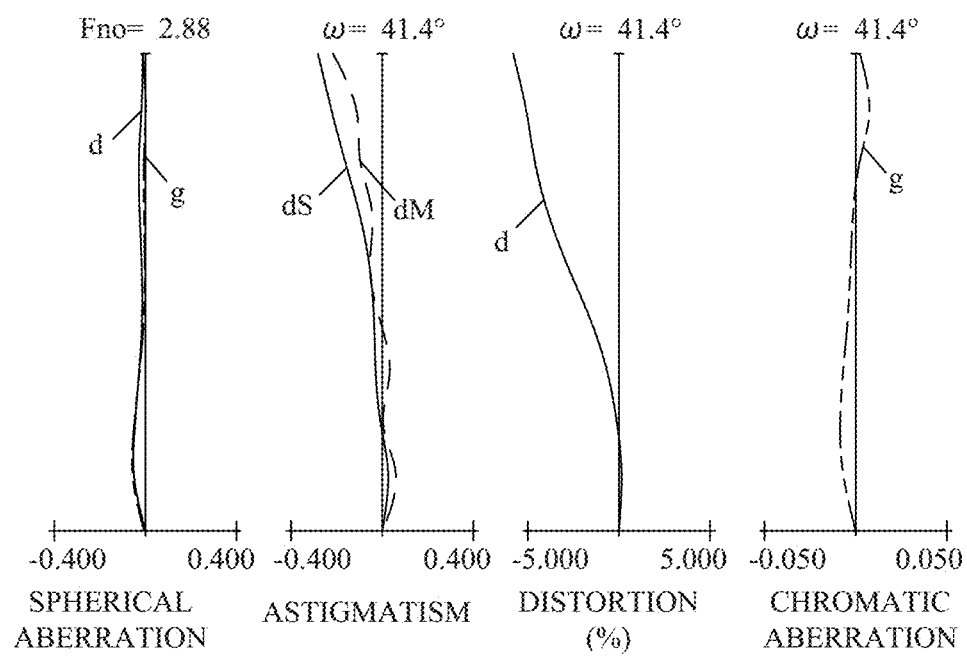
FIG. 6 is an aberration diagram of the optical system according to Example 3 in an in-focus state at infinity.
Figure 7:
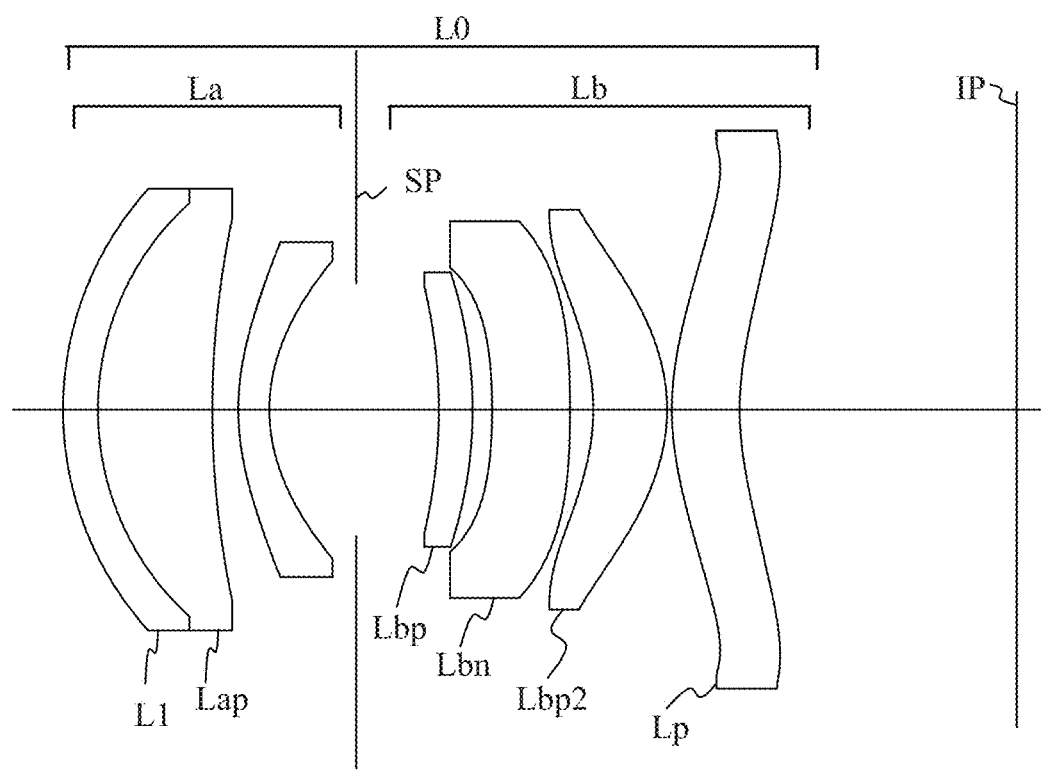
FIG. 7 is a sectional view of an optical system according to Example 4.
Figure 8:
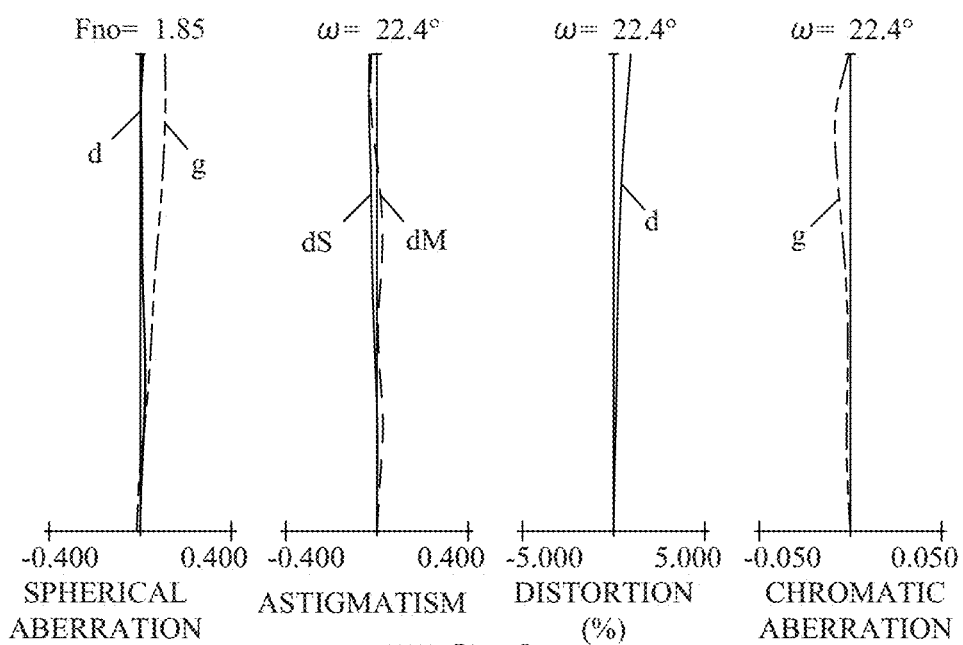
FIG. 8 is an aberration diagram of the optical system according to Example 4 in an in-focus state at infinity.

Referring now to the accompanying drawings, a detailed description will be given of an optical system and an image pickup apparatus having the same according to various examples. Corresponding elements in respective figures will be designated by the same reference numerals, and a duplicate description thereof will be omitted.

FIGS. 1, 3, 5, and 7 are sectional views of the optical systems L0 according to Examples 1 to 4, respectively. The optical system L0 according to each example is used in an image pickup apparatus such as a digital video camera, a digital still camera, a broadcasting camera, a film-based camera, and a surveillance camera.

In each lens sectional view, a left side is an object side and a right side is an image side. The optical system L0 according to each example includes a plurality of lenses, where La is a front group, Lb is a rear group, L1 is a negative lens disposed closest to the object, and Lp is a positive lens disposed closest to an image plane. SP is an aperture stop (diaphragm). The aperture stop SP determines (restricts) a light beam (luminous flux) of the maximum aperture F-number (Fno). IP denotes a (paraxial) image plane. In a case where the optical system L0 according to each example is used as an imaging optical system of a digital still camera or digital video camera, an imaging plane of a solid image sensor (photoelectric conversion element) such as a CCD sensor or a CMOS sensor is disposed on the image plane IP. In a case where the optical system L0 according to each example is used as an imaging optical system of a film-based camera, a photosensitive surface corresponding to the film plane is disposed on the image plane IP. In this specification, the "front group" and the "rear group" may include one or more lenses.

FIGS. 2, 4, 6, and 8 are aberration diagrams of the optical systems L0 according to Examples 1 to 4 in an in-focus state at infinity, respectively. In a spherical aberration diagram, Fno denotes the F-number. The spherical aberration diagram illustrates spherical aberration amounts for the d-line (wavelength 587.56 nm) and the g-line (wavelength 435.84 nm). In an astigmatism diagram, dS indicates a sagittal image plane, and dM indicates a meridional image plane. A distortion diagram illustrates a distortion amount for the d-line. A lateral chromatic aberration diagram illustrates a lateral chromatic aberration amount for the g-line. ω is an imaging half angle of view (°).

A description will now be given of the characteristic configuration of the optical system L0 according to each example.

The optical system L0 according to each example includes, in order from the object side to the image side, a front group La, an aperture stop SP, and a rear group Lb that has positive refractive power as a whole. The front group La includes a first lens L1 having negative refractive power and disposed closest to the object. The rear group Lb includes a final lens Lp having positive refractive power and disposed closest to the image plane. Four or more lenses are disposed between the first lens L1 and the final lens Lp. The optical system L0 according to each example employs a retrofocus type power arrangement to suppress the incident angle of the off-axis light beam on the image plane while maintaining high optical performance.

In the optical system L0 according to each example, the lens surface near the optical axis of the final lens Lp has a meniscus shape with a convex surface on the object side. Thereby, curvature of field and distortion are suppressed. "Near the optical axis" refers to a paraxial area, and in a case of an aspherical lens, a concave surface and a convex surface near the optical axis are defined by the sign of a paraxial radius of curvature. The positive and negative values of the refractive power are similarly calculated from the paraxial radius of curvature.

The optical system L0 according to each example satisfies the following inequality (1):

$$0.1 < TTL/(f \times \tan \omega) < 4.0 \tag{1}$$

where f is a focal length of the optical system L0, ω (°) is a half angle of view of the optical system L0, sk is a back focus of the optical system L0, and TTL is a length (overall lens length) acquired by adding the back focus sk to a distance on the optical axis from the lens surface closest to the object of the optical system L0 to the lens surface closest to the image plane of the optical system L0.

Inequality (1) defines a ratio between the overall lens length and the image height. In a case where the value of TTL/(f×tan ω) becomes higher than the upper limit of inequality (1), the overall lens length becomes longer and the optical system L0 becomes larger. In a case where the overall lens length becomes shorter and the value of TTL/(f×tan ω) becomes lower than the lower limit of inequality (1), the refractive power of each lens becomes strong, and it becomes difficult to satisfactorily correct both curvature of field and distortion.

The optical system L0 according to each example has the following inequality (2):

$$1.50 < PNdave < 2.00 \tag{2}$$

where PNdave is an average value of refractive indices for the d-line (wavelength 587.56 nm) of the materials of all positive lenses included in the optical system L0.

Inequality (2) defines an average refractive index of the positive lenses included in the optical system L0. In a case where the average refractive index becomes higher than the upper limit of inequality (2), chromatic dispersion becomes large, and it becomes difficult to correct longitudinal chromatic aberration. In a case where the average refractive index becomes lower than the lower limit of inequality (2), the Petzval sum of the entire system becomes large, and it becomes difficult to correct curvature of field.

The optical system L0 according to each example satisfies the following inequality (3):

$$0.2 < sk/TTL < 1.0 \tag{3}$$

Inequality (3) defines a ratio between the back focus and the overall lens length. In a case where the value of sk/TTL becomes higher than the upper limit of inequality (3), the overall lens length becomes longer. In a case where the back focus is so short that the value of sk/TTL becomes lower than the lower limit of inequality (3), the effective diameter of the final lens Lp disposed closest to the image plane becomes large, and the optical system L0 becomes larger in the radial direction.

Inequalities (1) to (3) may be replaced with inequalities (1a) to (3a) below:

$$1.0 < TTL/(f \times \tan \omega) < 3.5 \tag{1a}$$

$$1.55 < PNdave < 1.90 \tag{2a}$$

$$0.21 < sk/TTL < 0.60 \tag{3a}$$

Inequalities (1) to (3) may be replaced with inequalities (1b) to (3b) below:

$$1.5 < TTL/(f \times \tan \omega) < 3.1 \tag{1b}$$

$$1.60 < PNdave < 1.80 \tag{2b}$$

$$0.23 < sk/TTL < 0.35 \tag{3b}$$

A description will now be given of the configuration and conditions that may be satisfied by the optical system L0 according to each example.

The optical system L0 according to each example may satisfy the following inequality (4):

$$0.0 < |f/fa| < 1.0 \tag{4}$$

where fa is a focal length of the front group La.

Inequality (4) defines a ratio of the focal length of the front group La and the focal length of the optical system L0. In a case where the positive refractive power of the front group La becomes stronger and the value of |f/fa| becomes higher than the upper limit of inequality (4), pincushion distortion becomes larger and it becomes difficult to satisfactorily correct both curvature of field and distortion. In a case where the negative refractive power of the front group La becomes stronger and the value of |f/fa| becomes higher than the upper limit of inequality (4), the optical system approaches a telecentric optical system on the image side, and the overall lens length becomes longer. The value of

|f/fa| does not become lower than the lower limit of inequality (4). In a case where the optical system L0 is a zoom lens, f is the focal length of the zoom lens at the wide-angle end.

The optical system L0 according to each example may satisfy the following inequality (5):

$$0.6<fp/f<6.0 \quad (5)$$

where fp is a focal length of the final lens Lp.

Inequality (5) defines a ratio of the focal length of the final lens Lp to the focal length of the optical system L0. In a case where the refractive power of the final lens Lp becomes weaker and the value of fp/f becomes higher than the upper limit of inequality (5), it becomes difficult to correct pincushion distortion and suppress the incidence angle on the image plane. In a case where the refractive power of the final lens Lp becomes stronger and the value of fp/f becomes lower than the lower limit of inequality (5), the optical system L0 becomes close to a telecentric optical system on the image side, and the overall lens length becomes longer.

The optical system L0 according to each example may satisfy the following inequality (6):

$$0.1<sk/f<1.0 \quad (6)$$

Inequality (6) defines a ratio of the back focus of the optical system L0 to the focal length of the optical system L0. In a case where the back focus becomes longer and the value of sk/f becomes higher than the upper limit of inequality (6), the overall lens length becomes long. In a case where the back focus becomes shorter and the value of sk/f becomes lower than the lower limit of inequality (6), the effective diameter of the final lens Lp disposed closest to the image plane becomes larger, and the optical system L0 becomes larger in the radial direction.

The optical system L0 according to each example may satisfy the following inequality (7):

$$0.5<SPIP/TTL<1.0 \quad (7)$$

where SPIP is a distance on the optical axis from the aperture stop SP to the image plane IP.

Inequality (7) defines a ratio between the position of the aperture stop SP and the overall lens length. In a case where the position of the aperture stop SP becomes closer to the object and the value of SPIP/TTL becomes higher than the upper limit of inequality (7), vignetting tends to be biased and a blur shape becomes irregular. In a case where the position of the aperture stop SP becomes closer to the image plane and the value of SPIP/TTL becomes lower than the lower limit of inequality (7), the exit pupil approaches the image plane IP, and it becomes difficult to suppress the incident angle of the off-axis light beam on the image plane. In a case where the optical system L0 is a zoom lens, SPIP is a distance on the optical axis from the aperture stop SP of the zoom lens at the wide-angle end to the image plane IP.

The optical system L0 according to each example may satisfy the following inequality:

$$1.0<(R1+R2)/(R2-R1)<50.0 \quad (8)$$

where R1 is a paraxial radius of curvature of the lens surface on the object side of the final lens Lp, and R2 is a paraxial radius of curvature of the lens surface on the image side of the final lens Lp.

Inequality (8) defines a shape of the final lens Lp. In a case where the values of the object side paraxial radius of curvature R1 and the image side paraxial radius of curvature R2 become closer to each other and the value of (R1+R2)/(R2-R1) becomes higher than the upper limit of inequality (8), the refractive power of the final lens Lp becomes weaker, and it becomes difficult to suppress an incident angle of the off-axis light beam on the image plane. In a case where the value of (R1+R2)/(R2-R1) becomes lower than the lower limit of inequality (8), the image-side paraxial radius of curvature R2 of the final lens Lp becomes smaller, and it becomes difficult to satisfactorily correct both curvature of field and distortion.

In the optical system L0 according to each example, the final lens Lp may be made of plastic. The diameter of the final lens Lp generally tends to be larger, and if glass is used as the material for the final lens Lp, the weight of the lens increases.

In the optical system L0 according to each example, the final lens Lp may be a fixed focal length lens (single lens). The final lens Lp may not be a cemented lens, because it bends a light ray and makes weaker refractive power, and it becomes difficult to suppress an incident angle of an off-axis light beam on the image plane.

In the optical system L0 according to each example, the lens surface on the image side of the final lens Lp may be aspherical and have positive refractive power that is stronger at the peripheral portion than at the central portion. The lens surface on the image side of the final lens Lp may not be spherical, because it lacks refractive power for bending an off-axis light ray, and it becomes difficult to suppress an incident angle on the image plane and satisfactorily correct curvature of field.

In the optical system L0 according to each example, the lens surface on the image side of the final lens Lp may have an inflection point at the peripheral portion. If there is no inflection point on the lens surface on the image side of the final lens Lp, the refractive power for bending an off-axis light ray becomes insufficient, and it becomes difficult to suppress an incident angle on the image plane and satisfactorily correct curvature of field.

The optical system L0 according to each example may satisfy the following inequality (9):

$$1.450<Ndp<5.000/vdp+1.550 \quad (9)$$

where Ndp is a refractive index of the final lens Lp for the d-line, and vdp is an Abbe number of the final lens Lp based on the d-line.

Inequality (9) defines a refractive index of the final lens Lp. In a case where the refractive index of the final lens Lp becomes higher than the upper limit of inequality (9), a material with a small specific gravity cannot be selected, and the lens weight of the final lens Lp becomes heavy. In a case where the refractive index of the final lens Lp becomes lower than the lower limit of inequality (9), the Petzval sum of the entire system becomes larger, and it becomes difficult to correct curvature of field.

The optical system L0 according to each example may satisfy the following inequality (10):

$$0.0<|fb/fa|<2.0 \quad (10)$$

where fa is a focal length of the front group La, and fb is a focal length of the rear group Lb.

Inequality (10) defines a ratio of the focal length of the front group La to the focal length of the rear group Lb. In a case where the positive refractive power of the rear group Lb becomes weaker and the value of |fb/fa| becomes higher than the upper limit of inequality (10), it becomes difficult to correct pincushion distortion and suppress an incident angle on the image plane. In a case where the negative refractive power of the front group La becomes stronger and the value of |fb/fa| becomes higher than the upper limit of inequality (10), the optical system L0 approaches a telecentric optical system on the image side, and the overall lens length becomes longer. The value does not become lower than the lower limit of inequality (10).

The front group La may include one lens Lap (first positive lens) having positive refractive power, and the optical system L0 according to each example may satisfy the following inequality (11):

$$1.60 < Ndap < 2.00 \quad (11)$$

where Ndap is a refractive index of the lens Lap for the d-line.

Inequality (11) defines a refractive index of the positive lens Lap. In a case where the refractive index of the positive lens Lap becomes higher than the upper limit of inequality (11), chromatic dispersion becomes larger and it becomes difficult to correct longitudinal chromatic aberration. In a case where the refractive index of the positive lens Lap becomes lower than the lower limit of inequality (11), the Petzval sum of the entire system becomes large, and it becomes difficult to correct curvature of field.

The rear group Lb may include a lens Lbp (second positive lens) having positive refractive power, and the optical system L0 according to each example may satisfy the following inequality (12):

$$1.60 < Ndbp < 2.00 \quad (12)$$

where Ndbp is a refractive index of the lens Lbp for the d-line.

Inequality (12) defines a refractive index of the positive lens Lbp. In a case where the refractive index of the positive lens Lbp becomes higher than the upper limit of inequality (12), chromatic dispersion becomes large and it becomes difficult to correct longitudinal chromatic aberration. In a case where the refractive index of the positive lens Lbp is lower than the lower limit of inequality (12), the Petzval sum of the entire system becomes large, and it becomes difficult to correct curvature of field.

The rear group Lb may include a lens Lbn (first negative lens) having negative refractive power, and the optical system L0 according to each example may satisfy the following inequality (13):

$$0.0 < Ndbp - Ndbn < 0.4 \quad (13)$$

where Ndbn is a refractive index of the lens Lbn for the d-line.

Inequality (13) defines a refractive index difference between the positive lens Lbp and the negative lens Lbn. In a case where a material with a large refractive index difference exceeding the upper limit of inequality (13) is selected, achromatization becomes difficult and correction of longitudinal chromatic aberration becomes insufficient. In a case where a material with a small refractive index difference below the lower limit of inequality (13) is selected, the Petzval sum of the entire system becomes larger, and it becomes difficult to correct curvature of field.

The rear group Lb may include a lens Lbp2 (third positive lens) with positive refractive power, and the optical system L0 according to each example may satisfy the following inequality (14):

$$1.450 < Ndbp2 < 5.00/vdp2 + 1.550 \quad (14)$$

where Ndbp2 is a refractive index of the lens Lbp2 for the d-line, and vdp2 is an Abbe number of the lens Lbp2.

Inequality (14) defines a refractive index of the positive lens Lbp2. In a case where the refractive index of the positive lens Lbp2 becomes higher than the upper limit of inequality (14), chromatic dispersion becomes large, and it becomes difficult to correct longitudinal chromatic aberration and lateral chromatic aberration. In a case where the refractive index of the positive lens Lbp2 becomes lower than the lower limit of inequality (14), the Petzval sum of the entire system becomes larger, and it becomes difficult to correct curvature of field.

Inequalities (4) to (14) may be replaced with inequalities (4a) to (14a) below:

$$0.1 < |f/fa| < 0.9 \quad (4a)$$

$$1.0 < fp/f < 5.0 \quad (5a)$$

$$0.2 < sk/f < 0.7 \quad (6a)$$

$$0.60 < SPIP/TTL < 0.95 \quad (7a)$$

$$3.0 < (R1+R2)/(R2-R1) < 40.0 \quad (8a)$$

$$1.500 < Ndp < 5.000 vdp + 1.500 \quad (9a)$$

$$0.13 < |fb/fa| < 1.50 \quad (10a)$$

$$1.62 < Ndap < 1.97 \quad (11a)$$

$$1.70 < Ndbp < 1.95 \quad (12a)$$

$$0.02 < Ndbp - Ndbn < 0.20 \quad (13a)$$

$$1.500 < Ndbp2 < 5.000/vdp2 + 1.500 \quad (14a)$$

Inequalities (4) to (14) may be replaced with inequalities (4b) to (14b) below:

$$0.15 < |f/fa| < 0.80 \quad (4b)$$

$$2.0 < fp/f < 4.5 \quad (5b)$$

$$0.3 < sk/f < 0.5 \quad (6b)$$

$$0.65 < SPIP/TTL < 0.90 \quad (7b)$$

$$5.0 < (R1+R2)/(R2-R1) < 35.0 \quad (8b)$$

$$1.520 < Ndn < 5.000/vdn + 1.470 \quad (9b)$$

$$0.15 < |fb/fa| < 1.00 \quad (10b)$$

$$1.65 < Ndap < 1.96 \quad (11b)$$

$$1.75 < Ndbp < 1.91 \quad (12b)$$

$$0.030 < Ndbp - Ndbn < 0.125 \quad (13b)$$

$$1.520 < Ndbp2 < 5.000/vdp2 + 1.470 \quad (14b)$$

In the optical system L0 according to each example, an optical block such as a cover glass or an IR cut filter may be placed between the final lens Lp and the image plane IP. The refractive power of a lens refers to the refractive power near the optical axis (paraxial).

A description will now be given of numerical examples 1 to 4 corresponding to Examples 1 to 4.

In surface data of each numerical example, r represents a radius of curvature of each optical surface, and d (mm) represents an on-axis distance (distance on the optical axis) between an m-th surface and an (m+1)-th surface, where m is a surface number counted from the light incident side. nd represents a refractive index of each optical element for the d-line, and vd represents an Abbe number of the optical element. The Abbe number vd of a certain material is expressed as follows:

$$vd = (Nd-1)/(NF-NC)$$

where Nd, NF, and NC are refractive indices based on the d-line (587.6 nm), the F-line (486.1 nm), and the C-line (656.3 nm) in the Fraunhofer line, respectively.

In a case where the optical surface is aspherical, an asterisk * is attached to the right side of the surface number. The aspherical shape is expressed as follows:

$$X = \frac{(1/R)H^2}{1+\sqrt{1-(1+K)(H/R)^2}} + A3 \times |H|^3 + A4 \times |H|^4 + A5 \times |H|^5 + A6 \times |H|^6 + A7 \times |H|^7 + A8 \times |H|^8 + A9 \times |H|^9 + A10 \times |H|^{10} + A11 \times |H|^{11} + A12 \times |H|^{12} + A13 \times |H|^{13} + A14 \times |H|^{14}$$

where X is a displacement amount from a surface vertex in the optical axis direction (X-axis is set to the optical axis direction), H is a height from the optical axis in a direction orthogonal to the optical axis, a light traveling direction is set positive (H-axis is set to a direction orthogonal to the optical axis), R is a paraxial radius of curvature, K is a conic constant, and A3 to A14 are aspherical coefficients. "e±XX" in each aspheric coefficient means "×10$^{\pm XX}$."

In each numerical example, values of d, a focal length (mm), an F-number, and a half angle of view (°) are set in a case where the optical system according to each example is in an in-focus state on an infinity object. A "back focus" is a distance on the optical axis from the final lens surface (lens surface closest to the image plane) to the paraxial image plane expressed in air conversion length. An "overall lens length" is a length obtained by adding the back focus to a distance on the optical axis from the first lens surface (lens surface closest to the object) of the optical system L0 to the final lens surface of the optical system L0.

Numerical Example 1

UNIT: mm

SURFACE DATA

| Surface No. | r | d | nd | vd | Effective Diameter |
|---|---|---|---|---|---|
| 1 | −25.177 | 0.70 | 1.59270 | 35.3 | 13.96 |
| 2 | 20.767 | 3.17 | 1.91082 | 35.2 | 12.55 |
| 3 | −43.800 | 0.99 | | | 11.56 |
| 4 (SP) | ∞ | 2.60 | | | 10.15 |
| 5 | 14.261 | 3.51 | 1.87070 | 40.7 | 9.66 |
| 6 | −32.837 | 0.50 | 1.76182 | 26.5 | 8.96 |
| 7 | 12.505 | 2.07 | | | 9.50 |
| 8* | −235.152 | 1.68 | 1.53500 | 56.0 | 11.05 |
| 9* | −10000.000 | 5.43 | | | 13.28 |
| 10* | −11.334 | 3.63 | 1.53500 | 56.0 | 22.64 |
| 11* | −10.218 | 0.21 | | | 24.34 |
| 12* | 17.642 | 4.89 | 1.53500 | 56.0 | 32.10 |
| 13* | 22.064 | | | | 33.33 |
| Image Plane | ∞ | | | | |

ASPHERIC DATA

8th Surface

K = 0.00000e+00 A 4 = −1.04566e−03 A 6 = −9.37556e−05 A 8 = −5.53704e−07
A 3 = 9.72583e−04 A 5 = 3.63328e−04 A 7 = 1.17358e−05

9th Surface

K = 0.00000e+00 A 4 = −6.72372e−04 A 6 = −5.12270e−05 A 8 = −1.85093e−07
A 3 = 9.10492e−04 A 5 = 2.23735e−04 A 7 = 5.42283e−06

10th Surface

K = −1.83110e+01 A 4 = −6.24412e−04 A 6 = −4.26039e−05 A 8 = −1.18796e−07
A10 = 6.72472e−11
A 3 = −5.99283e−04 A 5 = 2.67221e−04 A 7 = 3.41220e−06

11th Surface

K = −4.49148e+00 A 4 = −2.32087e−03 A 6 = −6.08056e−05 A 8 = −1.49652e−07
A10 = 7.93407e−11
A 3 = 5.15205e−03 A 5 = 4.86742e−04 A 7 = 4.45108e−06

12th Surface

K = −5.38183e+01 A 4 = −1.74379e−03 A 6 = −2.16819e−05 A 8 = −7.33722e−08
A10 = −2.80326e−11
A 3 = 6.86749e−03 A 5 = 2.28224e−04 A 7 = 1.52808e−06 A 9 = 2.12818e−09

13th Surface

K = −2.25124e+01 A 4 = −1.07024e−03 A 6 = −3.50892e−05 A 8 = −1.81411e−07
A10 = −7.08372e−11
A 3 = 2.06768e−03 A 5 = 2.37331e−04 A 7 = 3.25539e−06 A 9 = 5.54475e−09

| | |
|---|---|
| Focal Length | 28.50 |
| Fno | 2.86 |
| Half Angle of View (°) | 37.20 |

-continued

| UNIT: mm | |
|---|---|
| Image Height | 21.64 |
| Overall Lens Length | 42.64 |
| BF | 13.25 |

| FIXED FOCAL LENGTH LENS DATA | | |
|---|---|---|
| Lens | Starting Surface | Focal Length |
| 1 | 1 | −19.09 |
| 2 | 2 | 15.84 |
| 3 | 5 | 11.83 |
| 4 | 6 | −11.83 |
| 5 | 8 | −450.15 |
| 6 | 10 | 90.91 |
| 7 | 12 | 118.74 |

Numerical Example 2

| UNIT: mm | | | | | |
|---|---|---|---|---|---|
| SURFACE DATA | | | | | |
| Surface No. | r | d | nd | vd | Effective Diameter |
| 1 | −32.094 | 0.80 | 1.59270 | 35.3 | 14.73 |
| 2 | 13.451 | 0.22 | | | 12.81 |
| 3 | 14.066 | 3.35 | 1.91082 | 35.2 | 12.77 |
| 4 | −81.655 | 0.88 | | | 11.75 |
| 5 (SP) | ∞ | 2.53 | | | 11.43 |
| 6 | 15.638 | 3.46 | 1.87070 | 40.7 | 10.75 |
| 7 | −22.209 | 0.50 | 1.76182 | 26.5 | 9.89 |
| 8 | 14.756 | 1.86 | | | 9.39 |
| 9* | −59.980 | 1.73 | 1.53500 | 56.0 | 10.55 |
| 10* | −370.728 | 5.41 | | | 12.83 |
| 11* | −15.950 | 4.36 | 1.53500 | 56.0 | 22.66 |
| 12* | −13.846 | 0.50 | | | 24.95 |
| 13* | 17.591 | 4.84 | 1.53500 | 56.0 | 32.60 |
| 14* | 24.164 | | | | 34.06 |
| Image Plane | ∞ | | | | |

ASPHERIC DATA

9th Surface

K = 0.00000e+00 A 4 = −1.08320e−03 A 6 = − 8.84422e−05 A 8 = −4.28559e−07
A 3 = 1.36888e−03 A 5 = 3.73165e−04 A 7 = 1.01971e−05
10th Surface K = 0.00000e+00 A 4 = −6.54688e−04 A 6 = − 5.27521e−05 A 8 = −2.13664e−07
A 3 = 1.34817e−03 A 5 = 2.38290e−04 A 7 = 5.74368e−06
11th Surface K = −3.44235e+01 A 4 = −6.38343e−04 A 6 = −4.26477e−05 A 8 = −1.18269e−07
A10 = 7.67530e−11
A 3 = 4.85557e−05 A 5 = 2.60713e−04 A 7 = 3.40467e−06
12th Surface K = −3.08794e+00 A 4 = −2.27652e−03 A 6 = −6.14607e−05 A 8 = −1.47175e−07
A10 = 8.73153e−11
A 3 = 6.04115e−03 A 5 = 4.80657e−04 A 7 = 4.43542e−06
13th Surface K = −4.72297e+01 A 4 = −1.76055e−03 A 6 = −2.19580e−05 A 8 = −7.23737e−08
A10 = −3.00758e−11
A 3 = 7.41113e−03 A 5 = 2.27924e−04 A 7 = 1.52563e−06 A 9 = 2.15652e−09
14th Surface K = −1.98741e+01 A 4 = −1.02271e−03 A 6 = −3.50501e−05 A 8 = −1.81558e−07
A10 = −7.04181e−11
A 3 = 2.24813e−03 A 5 = 2.31781e−04 A 7 = 3.26449e−06 A 9 = 5.53025e−09

| Focal Length | 28.50 |
|---|---|
| Fno | 2.55 |

-continued

| UNIT: mm | |
|---|---|
| Half Angle of View (°) | 37.20 |
| Image Height | 21.64 |
| Overall Lens Length | 42.90 |
| BF | 12.46 |

FIXED FOCAL LENGTH LENS DATA

| Lens | Starting Surface | Focal Length |
|---|---|---|
| 1 | 1 | −15.89 |
| 2 | 3 | 13.40 |
| 3 | 6 | 11.01 |
| 4 | 7 | −11.57 |
| 5 | 9 | −134.01 |
| 6 | 11 | 113.90 |
| 7 | 13 | 96.18 |

Numerical Example 3

UNIT: mm

SURFACE DATA

| Surface No. | r | d | nd | vd | Effective Diameter |
|---|---|---|---|---|---|
| 1* | −10000.000 | 1.40 | 1.58313 | 59.4 | 14.29 |
| 2* | 8.753 | 1.18 | | | 11.59 |
| 3 | 16.891 | 3.83 | 1.65160 | 58.5 | 11.36 |
| 4 | −41.966 | 1.09 | | | 9.89 |
| 5 (SP) | ∞ | 2.29 | | | 9.86 |
| 6 | 18.502 | 3.48 | 1.75500 | 52.3 | 10.45 |
| 7 | −18.130 | 0.30 | | | 11.14 |
| 8 | −27.428 | 4.40 | 1.61800 | 63.4 | 11.24 |
| 9 | −9.134 | 1.40 | 1.72047 | 34.7 | 11.97 |
| 10 | 28.012 | 2.88 | | | 13.50 |
| 11* | −34.743 | 1.78 | 1.53500 | 56.0 | 14.17 |
| 12* | −37.819 | 2.42 | | | 16.62 |
| 13* | −11.863 | 4.35 | 1.53500 | 56.0 | 21.28 |
| 14* | −11.484 | 0.53 | | | 23.83 |
| 15* | 11.840 | 5.30 | 1.53500 | 56.0 | 33.89 |
| 16* | 13.127 | | | | 35.46 |
| Image Plane | ∞ | | | | |

ASPHERIC DATA

1st Surface $K = 0.00000e+00$ $A4 = -6.78455e-04$ $A6 = 1.33354e-05$ $A8 = 1.35788e-07$
$A3 = -4.26570e-04$ $A5 = 6.91920e-05$ $A7 = -2.74199e-06$ 2nd Surface $K = 3.64968e-01$ $A4 = -7.75157e-04$ $A6 = 7.33843e-06$ $A8 = -1.12711e-07$
$A3 = -6.44618e-04$ $A5 = 5.38136e-05$ $A7 = -6.10266e-07$ 11th Surface $K = 0.00000e+00$ $A4 = -3.75054e-04$ $A6 = -1.13030e-06$ $A8 = 7.88726e-08$
$A10 = -4.67549e-10$ 12th Surface $K = 0.00000e+00$ $A4 = -1.45507e-04$ $A6 = -1.64020e-06$ $A8 = -7.72645e-08$
$A10 = -3.93531e-10$ 13th Surface
$K = -1.27759e+01$ $A4 = 2.63706e-04$ $A6 = 5.73607e-06$ $A8 = 2.93093e-08$
$A10 = -4.45514e-11$
$A3 = -7.93420e-04$ $A5 = -3.18814e-05$ $A7 = -6.11948e-07$ 14th Surface $K = -1.19491e+00$ $A4 = -2.26442e-06$ $A6 = -7.81773e-06$ $A8 = -1.34278e-08$
$A10 = -1.79310e-11$
$A3 = -1.85363e-04$ $A5 = 4.90241e-05$ $A7 = 5.85849e-07$ -continued

| UNIT: mm | |
|---|---|

15th Surface

K = −1.36904e+00 A 4 = −1.04565e−03 A 6 = −2.43530e−05 A 8 = −1.17262e−07
A10 = −4.25806e−11
A 3 = 6.74386e−04 A 5 = 1.89856e−04 A 7 = 2.16124e−06 A 9 = 3.46428e−09

16th Surface

K = −5.78503e−01 A 4 = −8.35374e−04 A 6 = −8.61317e−06 A 8 = −2.43644e−08
A10 = −5.39681e−12
A 3 = 6.50288e−04 A 5 = 9.88435e−05 A 7 = 5.66400e−07 A 9 = 5.68901e−10

| | |
|---|---|
| Focal Length | 24.50 |
| Fno | 2.88 |
| Half Angle of View (0) | 41.45 |
| Image Height | 21.64 |
| Overall Lens Length | 47.90 |
| BF | 11.28 |

| FIXED FOCAL LENGTH LENS DATA | | |
|---|---|---|
| Lens | Starting Surface | Focal Length |
| 1 | 1 | −15.00 |
| 2 | 3 | 18.97 |
| 3 | 6 | 12.65 |
| 4 | 8 | 20.29 |
| 5 | 9 | −9.41 |
| 6 | 11 | −1000.00 |
| 7 | 13 | 134.24 |
| 8 | 15 | 92.69 |

Numerical Example 4

| UNIT: mm | | | | | |
|---|---|---|---|---|---|
| SURFACE DATA | | | | | |
| Surface No | r | d | nd | vd | Effective Diameter |
| 1 | 14.120 | 1.50 | 1.72825 | 28.5 | 17.88 |
| 2 | 12.036 | 4.92 | 1.80400 | 46.5 | 16.78 |
| 3 | 39.963 | 1.12 | | | 15.23 |
| 4* | 11.035 | 1.33 | 1.68040 | 18.1 | 13.34 |
| 5* | 7.194 | 3.74 | | | 11.62 |
| 6 (SP) | ∞ | 3.55 | | | 10.86 |
| 7 | −22.824 | 1.45 | 1.80400 | 46.5 | 9.55 |
| 8 | −18.868 | 0.84 | | | 10.65 |
| 9* | −23.270 | 3.35 | 1.68040 | 18.1 | 11.06 |
| 10* | −47.108 | 1.00 | | | 15.04 |
| 11* | −9.509 | 3.17 | 1.53110 | 56.0 | 16.10 |
| 12* | −8.011 | 0.20 | | | 17.13 |
| 13* | 11.951 | 2.92 | 1.61550 | 25.8 | 21.03 |
| 14* | 12.696 | (variable) | | | 22.14 |
| Image Plane | ∞ | | | | |

ASPHERIC DATA

4th Surface

K = −2.68850e+00 A 4 = −1.04742e−04 A 6 = 5.62415e−07 A 8 = −4.65789e−08
A10 = 2.52007e−09 A12 = −5.22231e−11 A14 = 3.79457e−13

5th Surface

K = 0.00000e+00 A 4 = −4.81826e−04 A 6 = − 2.05447e−06 A 8 = −4.94086e−08
A10 = 1.93962e−09 A12 = −6.95594e−11

9th Surface

K = 0.00000e+00 A 4 = −4.55340e−04 A 6 = − 4.28696e−06 A 8 = 3.05739e−08
A10 = −4.04397e−09 A12 = 3.30442e−11

10th Surface

K = 0.00000e+00 A 4 = −4.30569e−04 A 6 = 3.47076e−06 A 8 = −7.93640e−08
A10 = 1.63383e−09 A12 = −1.90372e−11 A14 = 7.68428e−14

-continued

UNIT: mm

11th Surface

K = 0.00000e+00 A 4 = 5.25524e−04 A 6 = − 7.46425e−06 A 8 = 3.18527e−07
A10 = −4.06261e−09 A12 = 1.74226e−11 A14 = 2.64968e−14
12th Surface K = −7.76547e−01 A 4 = 1.31469e−04 A 6 = 1.25454e−06 A 8 = −2.88332e−08
A10 = 7.18099e−10 A12 = −5.93048e−12 A14 = 1.52782e−14
13th Surface K = 0.00000e+00 A 4 = −5.76433e−04 A 6 = 8.17828e−06 A 8 = −1.15678e−07
A10 = 9.44995e−10 A12 = −4.20503e−12 A14 = 5.71111e−15
14th Surface K = 0.00000e+00 A 4 = −6.44620e−04 A 6 = 9.84059e−06 A 8 = −1.34057e−07
A10 = 1.11603e−09 A12 = −5.29814e−12 A14 = 9.97952e−15

| | |
|---|---|
| Focal Length | 33.08 |
| Fno | 1.85 |
| Half Angle of View (°) | 22.44 |
| Image Height | 13.66 |
| Overall Lens Length | 41.00 |
| BF | 11.91 |

FIXED FOCAL LENGTH LENS DATA

| Lens | Starting Surface | Focal Length |
|---|---|---|
| 1 | 1 | −160.68 |
| 2 | 2 | 19.86 |
| 3 | 4 | −35.31 |
| 4 | 7 | 116.37 |
| 5 | 9 | −71.66 |
| 6 | 11 | 55.21 |
| 7 | 13 | 132.76 |

TABLE 1 below summarizes various values of each numerical example.

| | Example 1 | Example 2 | Example 3 | Example 4 |
|---|---|---|---|---|
| Inequality (1) | 1.970 | 1.983 | 2.214 | 3.002 |
| Inequality (2) | 1.713 | 1.713 | 1.619 | 1.689 |
| Inequality (3) | 0.311 | 0.290 | 0.236 | 0.294 |
| Inequality (4) | 0.377 | 0.418 | 0.182 | 0.746 |
| Inequality (5) | 4.166 | 3.375 | 3.783 | 3.993 |
| Inequality (6) | 0.465 | 0.437 | 0.461 | 0.363 |
| Inequality (7) | 0.886 | 0.878 | 0.844 | 0.686 |
| Inequality (8) | 8.980 | 6.353 | 19.398 | 33.083 |
| Inequality (9) | 1.535 | 1.535 | 1.535 | 1.616 |
| Inequality (10) | 0.525 | 0.607 | 0.184 | 0.934 |
| Inequality (11) | 1.911 | 1.911 | 1.652 | 1.804 |
| Inequality (12) | 1.871 | 1.871 | 1.755 | 1.804 |
| Inequality (13) | 0.109 | 0.109 | 0.035 | 0.124 |
| Inequality (14) | 1.535 | 1.535 | 1.535 | 1.531 |

Image Pickup Apparatus

Figure 9:
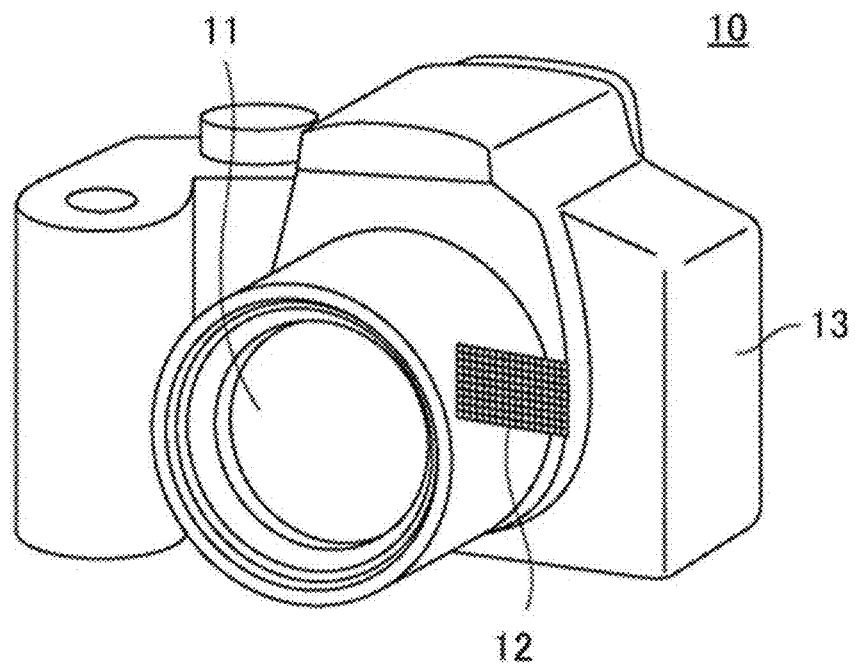
FIG. 9 is a schematic diagram of the image pickup apparatus.

Referring now to FIG. 9, a description will now be given of an example of a digital still camera (image pickup apparatus) 10 using the optical system L0 as an imaging optical system. In FIG. 9, reference numeral 13 denotes a camera body, and reference numeral 11 denotes an imaging optical system that includes any of the optical systems L0 according to Examples 1 to 4. Reference numeral 12 denotes a solid-state image sensor (photoelectric conversion element) such as a CCD sensor or a CMOS sensor, which is built in the camera body 13 and receives an optical image formed by the imaging optical system 11 and photoelectrically converts it. The camera body 13 may be a so-called single-lens reflex camera with a quick turn mirror, or a so-called mirrorless camera without a quick turn mirror.

Thus applying the optical system L0 to an image pickup apparatus such as a digital still camera can provide an image pickup apparatus with a small lens.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide an optical system that is small and lightweight and has high optical performance.

This application claims the benefit of Japanese Patent Application No. 2022-195846, filed on Dec. 7, 2022, which is hereby incorporated by reference herein in its entirety.

What is claimed is:

1. An optical system comprising, in order from an object side to an image side, a front group, an aperture stop, and a rear group that has positive refractive power as a whole, wherein the front group includes a first lens having negative refractive power disposed closest to an object, wherein the rear group includes a final lens having positive refractive power disposed closest to an image plane, wherein the optical system includes four or more lenses disposed between the first lens and the final lens, wherein a lens surface near an optical axis of the final lens has a meniscus shape with a convex surface on the object side, and wherein the following inequalities are satisfied:

$$0.1 < TTL/(f \times \tan \omega) < 4.0;$$

$$1.50 < PNdave < 2.00;$$

$$0.2 < sk/TTL < 1.0;$$

where f is a focal length of the optical system, ω (°) is a half angle of view of the optical system, sk is a back focus of the optical system, TTL is a length acquired by adding the back focus to a distance on an optical axis from a lens surface closest to the object of the optical system to a lens surface closest to an image plane of the optical system, and PNdave is an average value of refractive indices for d-line of materials of all positive lenses included in the optical system.

2. The optical system according to claim 1, wherein the following inequality is satisfied:

$$0.0<|f/fa|<1.0,$$

where fa is a focal length of the front group.

3. The optical system according to claim 1, wherein the following inequality is satisfied:

$$0.6<fp/f<6.0,$$

where fp is a focal length of the final lens.

4. The optical system according to claim 1, wherein the following inequality is satisfied:

$$0.1<sk/f<1.0.$$

5. The optical system according to claim 1, wherein the following inequality is satisfied:

$$0.5<SPIP/TTL<1.0,$$

where SPIP is a distance on the optical axis from the aperture stop to the image plane.

6. The optical system according to claim 1, wherein the following inequality is satisfied:

$$1.0<(R1+R2)/(R2-R1)<50.0,$$

where R1 is a paraxial radius of curvature of a lens surface on the object side of the final lens, and R2 is a paraxial radius of curvature of a lens surface on the image side of the final lens.

7. The optical system according to claim 1, wherein the final lens is made of plastic.

8. The optical system according to claim 1, wherein the final lens is a fixed focal length lens.

9. The optical system according to claim 1, wherein a lens surface on the image side of the final lens is aspherical and has positive refractive power that is stronger at a peripheral portion than at a central portion.

10. The optical system according to claim 1, wherein a lens surface on the image side of the final lens has an inflection point at a peripheral portion.

11. The optical system according to claim 1, wherein the following inequality is satisfied:

$$1.450<Ndp<5.000/vdp+1.550,$$

where Ndp is a refractive index of the final lens for the d-line, and vdp is an Abbe number of the final lens based on the d-line.

12. The optical system according to claim 1, wherein the following inequality is satisfied:

$$0.0<|fb/fa|<2.0,$$

where fa is a focal length of the front group, and fb is a focal length of the rear group.

13. The optical system according to claim 1, wherein the front group includes a first positive lens having positive refractive power and the following inequality is satisfied:

$$1.60<Ndap<2.00,$$

where Ndap is a refractive index of the first positive lens for the d-line.

14. The optical system according to claim 1, wherein the rear group includes a second positive lens having positive refractive power, and the following inequality is satisfied:

$$1.60<Ndbp<2.00,$$

where Ndbp is a refractive index of the second positive lens for the d-line.

15. The optical system according to claim 14, wherein the rear group includes a first negative lens having negative refractive power, and the following inequality is satisfied:

$$0.0<Ndbp-Ndbn<0.4,$$

where Ndbn is a refractive index of the first negative lens for the d-line.

16. The optical system according to claim 14, wherein the rear group includes a third positive lens having positive refractive power, and the following inequality is satisfied:

$$1.450<Ndbp2<5.000/vdp2+1.550,$$

where Ndbp2 is a refractive index of the third positive lens for the d-line, and vdp2 is an Abbe number of the third positive lens based on the d-line.

17. An image pickup apparatus comprising:
an optical system; and an image sensor configured to receive an image light formed by the optical system, wherein the optical system includes, in order from an object side to an image side, a front group, an aperture stop, and a rear group that has positive refractive power as a whole, wherein the front group includes a first lens having negative refractive power disposed closest to an object, wherein the rear group includes a final lens having positive refractive power disposed closest to an image plane, wherein the optical system includes four or more lenses disposed between the first lens and the final lens, wherein a lens surface near an optical axis of the final lens has a meniscus shape with a convex surface on the object side, and wherein the following inequalities are satisfied:

$$0.1<TTL/(f\times\tan\omega))<4.0;$$

$$1.50<PNdave<2.00;$$

$$0.2<sk/TTL<1.0;$$

where f is a focal length of the optical system, ω (°) is a half angle of view of the optical system, sk is a back focus of the optical system, TTL is a length acquired by adding the back focus to a distance on an optical axis from a lens surface closest to the object of the optical system to a lens surface closest to an image plane of the optical system, and PNdave is an average value of refractive indices for d-line of materials of all positive lenses included in the optical system.

* * * * *